Dec. 9, 1930.  J. A. WALSH  1,784,121
COMBINATION HARVESTER THRASHER
Filed Feb. 17, 1925
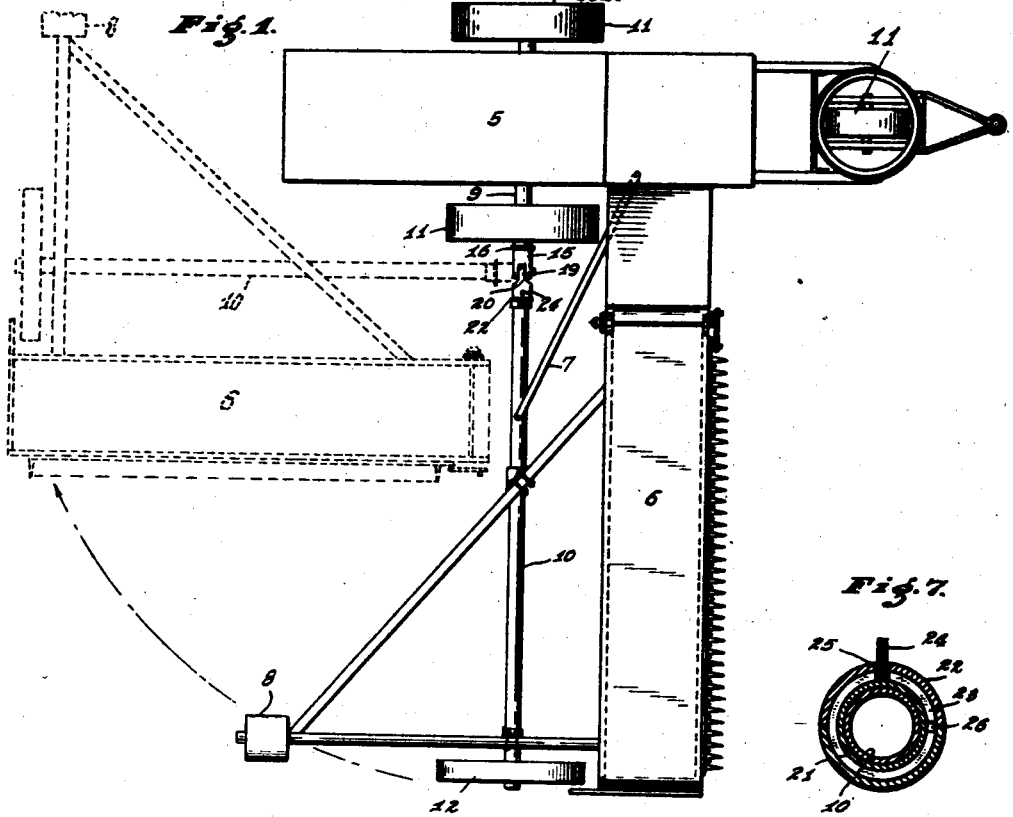
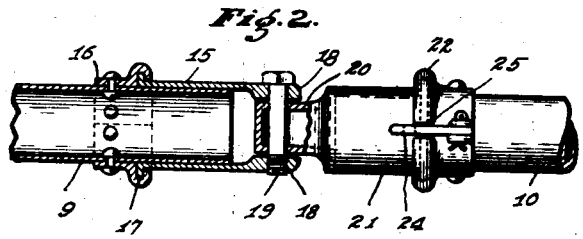
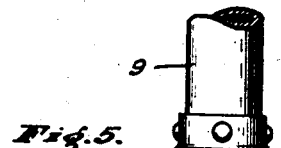
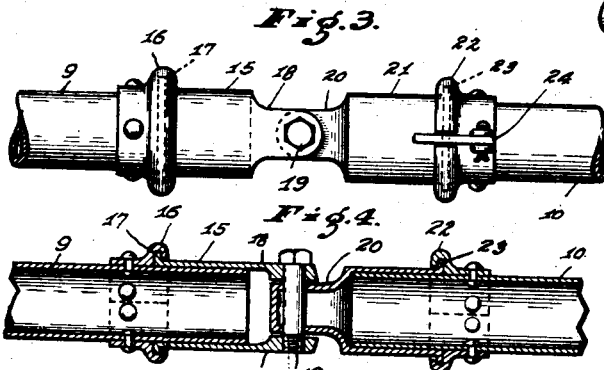
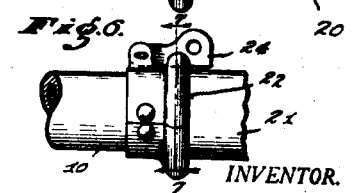
INVENTOR.
James A. Walsh Patented Dec. 9, 1930

1,784,121

UNITED STATES PATENT OFFICE

JAMES A. WALSH, OF INDIANAPOLIS, INDIANA, ASSIGNOR TO J. I. CASE COMPANY, OF RACINE, WISCONSIN, A CORPORATION

COMBINATION HARVESTER THRASHER

Application filed February 17, 1925. Serial No. 9,898.

The object of my invention is to provide a simple and efficient coupling for flexibly connecting the harvesting and thrashing elements of combination harvester-thrashers in order that the harvester may move in vertical directions when traveling over ground irregularities during the operation of cutting and thrashing grain, and by said coupling may also be swung horizontally alongside the thrasher when transporting the machine over roads, bridges and through passageways, as when thus folded the machine as a whole is materially reduced in width, as will be hereinafter more particularly pointed out.

In the accompanying drawing, forming part hereof, Figure 1 is a plan illustrating a combination harvester-thrasher with the axle thereof connected by my improved coupling; Fig. 2 a plan of the coupling partially in section showing the same arranged for permitting the axle sections to swing vertically; Fig. 3 a plan showing the coupling in position to swing the axle horizontally; Fig. 4 a longitudinal section through the combined axle and coupling structure when in the position shown in Fig. 2; Fig. 5 a plan showing the coupling and axle swung in horizontal position; Fig. 6 a detail elevation showing the coupling locked in position; and Fig. 7 a transverse sectional view taken on the dotted line 7—7 in Fig. 6.

In said drawings the portions marked 5 and 6 indicate the thrasher and harvester, respectively, which may be connected by a brace rod, 7, and provided with a counter balancing weight, 8, and other details of construction common to such machines.

As illustrating a manner of employing my improvement, the axle sections, 9, 10, of the machine, which are mounted in the carrying wheels, 11, 12, are connected by my coupling, by which the harvester 6 supported by said axle may be adjusted in both vertical and horizontal directions. In its preferred form said coupling comprises a tubular socket member, 15, supported by a flanged collar, 16, secured to axle section 9, said member 15 having a flange, 17, fitting within said collar so that the same may be rotated about said axle and held from longitudinal displacement. Said socket member terminates in or is provided with hinge knuckles, 18, which are connected by a pintle, 19, to a mating knuckle, 20, forming part of a flanged socket member, 21, secured to axle section 10 by a flanged collar, 22, within which the flange, 23, of said socket is rotatably mounted in a manner similar to socket 15, by which flanged socket member 21 and axle 10 are held from longitudinal displacement. The flanged collars 16 and 22 are preferably split, as indicated in Figs. 4 and 6, so that they may be assembled with the flanged socket members 15, 21, respectively, and the supports upon which they are mounted. Said member 21 is provided with a latch, 24, adapted to normally lie in the notches, 25, 26, respectively, in the flanges 22 and 23, as indicated in Fig. 7.

In Fig. 2 the coupling is shown in position to permit the hinge members 21, to move in vertical directions as the machine travels through the field and encounters undulatory ground conditions during the harvesting operation, the latch 24, inserted in the flanges 22 and 23, maintaining said members 15 and 21 in such relation that pintle 19 will lie horizontally between them. When it is desired to swing the harvester 6 alongside and parallel with the thrasher 5, it is but necessary to throw latch 24 outwardly from notch 25, so that socket members 15 and 21 may together be rotated around the axle sections 9, 10, about ninety degrees, where a second notch, 26, in flange 23 will register with notch 25, when the latch 24 may be inserted therein and thus lock the same, so that the hinge joint and pintle 19 will be in the position indicated in Fig. 3, that is, said pintle will have assumed a vertical position, thus permitting axle section 10 to be swung horizontally, as indicated in Figs. 1 and 5, to bring harvester 6 alongside the thrasher, as indicated by dotted lines in Fig. 1.

While I have shown my improved coupling applied to axle sections of the machine it will be understood that the coupling members may be secured directly to the frames or other parts of the machine elements and the horizontal and vertical movements referred to be thus accomplished.

In cutting operations in the field with a combined harvester-thrasher it is essential that the harvester, as 6, be so mounted and controlled as to be adjustable to the varying heights of cut of the grain, and such adjustments are frequently necessary in cutting grain in ground depressions and in areas where such grain is of uneven growth. Mechanism connected to the harvester and to the thrasher, under control of an operator on the thrasher, for effecting such adjustments is disclosed in the MacGregor Patent No. 16,378, reissued July 6, 1926, and which or other suitable devices may be employed in connection with my improvement for so manipulating the harvester 6, which latter is supported on the axle 10. The axle being rotatably connected to the thrasher by the socket member 21 is capable of rocking, so that when the harvester is raised and lowered the axle will accordingly rock, and by employing a device such as a weight as 8 or its equivalent, and associating the same with the harvester, counterbalancing of the offset weight of the latter is accomplished, and the adjustment of the heavy harvester is readily effected by any suitable mechanism as herein referred to. It will therefore be apparent that by my improvement the harvester platform, through its rocking support 10 hinged to an appropriate part of the thrasher, is capable of free vertically swinging movement to meet irregularities in cutting the varied heights of the grain crop, and also is free to oscillate vertically as the wheel 12 encounters ground undulations.

I claim as my invention:

1. A connection for a machine embodying a combined harvester and thrasher, comprising two axle sections, a pair of hinged members, each having a laterally projecting flange, a collar secured to each of said sections and having a laterally projecting flange in which one of said hinged member flanges is rotatably mounted, one of said hinged member flanges having a notch and the cooperating collar flange having a notch adapted to register therewith, and a latch for insertion in said notches to prevent relative rotation of said notched parts.

2. A connection for a machine embodying a combined harvester and thrasher said harvester having a horizontal supporting axle embodying a flange, a hinge member comprising a collar having a flange swivelingly connected to said axle flange, a flange on the thrasher, a hinge member comprising a collar having a flange swivelingly connected to the thrasher flange, means connecting said hinge members whereby they may together rotate in said axle and thrasher flanges, and means for securing the hinge members in non-rotatable relation to the axle and thrasher flanges.

In testimony whereof I affix my signature.

JAMES A. WALSH.